United States Patent [19]

Lewandowski et al.

[11] Patent Number: 5,747,551
[45] Date of Patent: May 5, 1998

[54] UV CURABLE PRESSURE SENSITIVE ADHESIVE COMPOSITION

[75] Inventors: Mark A. Lewandowski, Marysville; Anthony M. Chasser, Fort Gratiot, both of Mich.

[73] Assignee: Acheson Industries, Inc., Port Huron, Mich.

[21] Appl. No.: 704,377

[22] Filed: Aug. 22, 1996

Related U.S. Application Data

[63] Continuation of Ser. No. 349,687, Dec. 5, 1994, abandoned.

[51] Int. Cl.$^6$ .............. C08F 2/50; C08L 75/16; C09J 109/00; C09J 175/14
[52] U.S. Cl. .............. 522/95; 522/96; 522/98; 156/275.5
[58] Field of Search .............. 522/95, 96, 98, 522/79

[56] References Cited

U.S. PATENT DOCUMENTS

| | | | |
|---|---|---|---|
| 4,399,239 | 8/1983 | Herwig et al. | 522/95 |
| 4,959,178 | 9/1990 | Frentzel et al. | 252/514 |
| 5,011,560 | 4/1991 | Nakai et al. | 522/96 |
| 5,151,454 | 9/1992 | Goto et al. | 522/96 |
| 5,200,438 | 4/1993 | Fujii et al. | 522/96 |
| 5,213,875 | 5/1993 | Su et al. | 428/209 |
| 5,227,442 | 7/1993 | Babu et al. | 526/279 |
| 5,248,716 | 9/1993 | Lin et al. | 524/268 |
| 5,292,842 | 3/1994 | Yang | 525/342 |
| 5,294,668 | 3/1994 | Babu | 525/80 |
| 5,296,561 | 3/1994 | Babu et al. | 526/318.4 |
| 5,312,943 | 5/1994 | Gaglani | 556/414 |
| 5,314,748 | 5/1994 | Mazurek et al. | 428/345 |
| 5,317,055 | 5/1994 | Yang | 524/458 |

FOREIGN PATENT DOCUMENTS 9413749   6/1994   WIPO.

OTHER PUBLICATIONS

Nagarajan et al. "Synthesis and Characterization of Radiation Curable Polyurethanes Containing Pendant Acrylate Groups", Polymer Eng. and Sci., vol. 26, No. 20, 1986.

*Primary Examiner*—Susan W. Berman
*Attorney, Agent, or Firm*—Dinnin & Dunn, P.C.

[57] ABSTRACT

A new UV curable pressure sensitive adhesive composition, which comprises in weight percent: about 0.1% to about 15% of a photoinitiator agent, about 10% to about 80% of a polyurethane resin with a pendent acrylate functionality, zero to about 70% by of an acrylate monomer, about 0.1% to about 25% by weight of a an acrylated polybutadiene component, and zero to about 50% by weight of a tackifier agent.

7 Claims, 2 Drawing Sheets

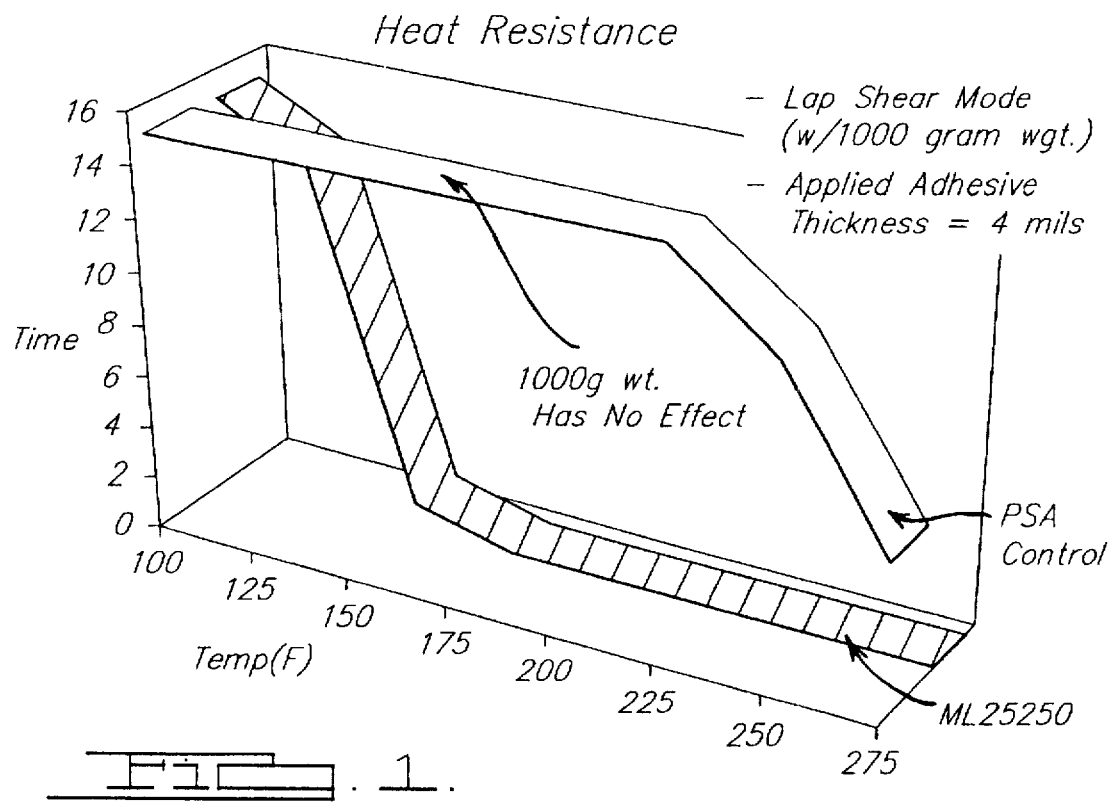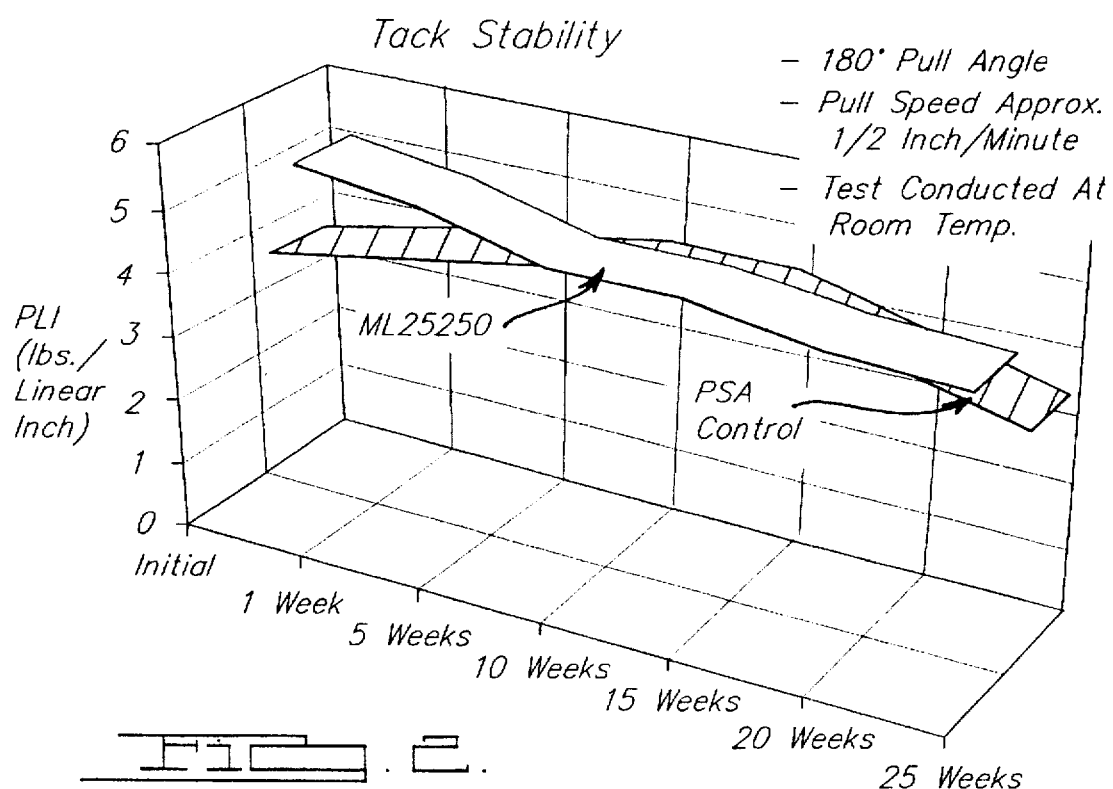

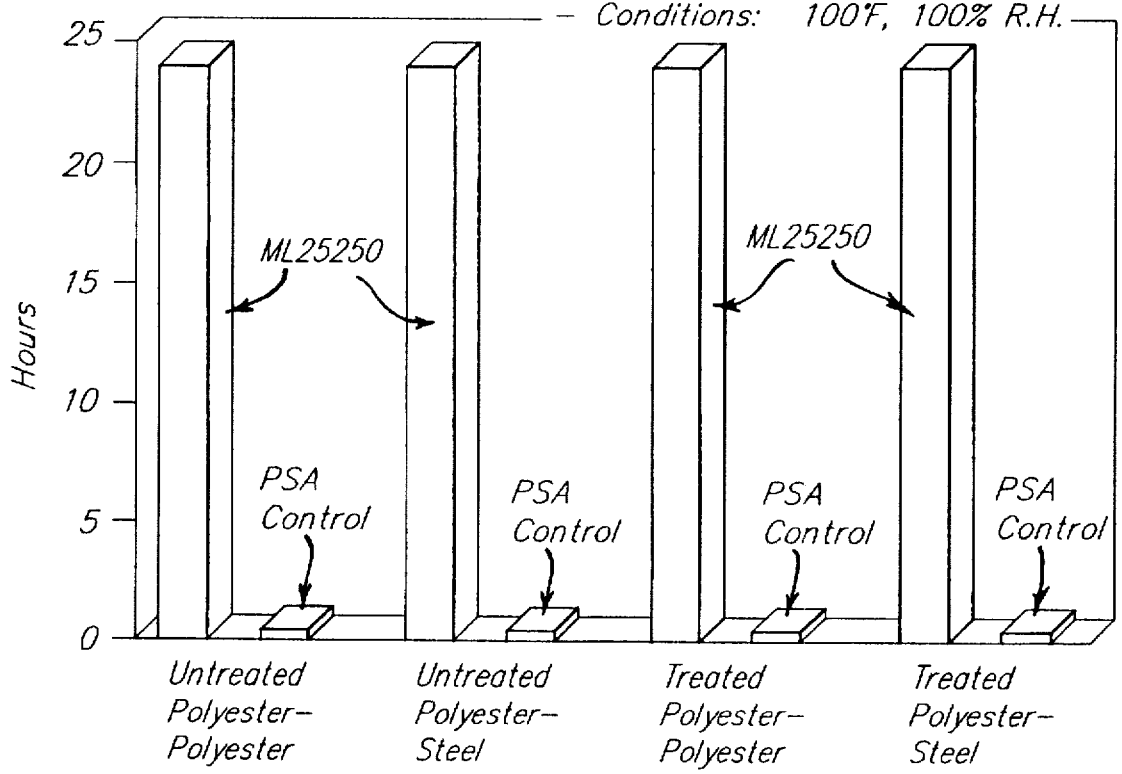
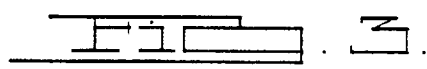

UV CURABLE PRESSURE SENSITIVE ADHESIVE COMPOSITION

This is a continuation of U.S. Pat. application Ser. No. 08/349,687, filed Dec. 5, 1994, now abandoned.

BACKGROUND OF THE INVENTION

This invention broadly relates to a new UV curable pressure sensitive adhesive composition and method of using same. By the term "UV curable" as used herein it is meant curable with ultraviolet radiation.

Pressure sensitive adhesives are materials that form a bond with very light pressure. The cured adhesive is neither solid nor liquid, but rather is a viscoelastic material that is usually quite tacky. While pressure sensitive adhesives are available as 100% solids for hot melt applications, and as water-based emulsion acrylic systems, the majority of the approximately 500 million dry pound domestic market in the U.S.A. are solvent based products. UV curable pressure sensitive adhesives represent only a few percent of the market, in large part because of the problem with their historical poor high temperature properties. In the past it has been thought that a UV curable pressure sensitive adhesive exhibiting acceptable high temperature and environmental performance characteristics could capture a large percent of the market share for pressure sensitive adhesives. Also in the past, there have been some UV curable pressure sensitive adhesives which included a polyurethane resin; however, they did not have the necessary integrity or performance characteristics at temperatures above approximately 130°–140° F., and they also exhibited poor humidity resistance.

While UV curable pressure sensitive adhesives do not currently command a significant market share, the interest remains high in this type of pressure sensitive adhesive technology. Various other companies and individuals have worked on solving the problems associated with this technology; however, such other parties have not been able to develop satisfactory products which would be usable and worthwhile in industry.

Pressure sensitive adhesives (PSAs) are tacky substances normally or often placed on backing materials which, when brought in contact with a surface under light contact exhibit sufficient cohesiveness as to resist peeling away from that surface. Classic examples of the usage of pressure sensitive adhesives are tapes, bandaids, and labels.

The chemistry of pressure sensitive adhesives can be roughly sub-divided into three large groups: 1) solvent-based adhesives, 2) water-based adhesives, and 3) radiation cured adhesives.

Solvent-based adhesives are typically ultra-high molecular weight (Mw), soft polymers (low Tg) dissolved in solvent; when applied to a backing material, they provide tack or stickiness of the backing material to a contacted surface. While the chemistry involved is complex, involving different chemical polymers and block copolymer polymerizations, it can be reduced to one generic classification—thermoplastic polymers (TPs). Thermoplastic polymers on this theme are large, low Tg molecules which entangle on a molecular level, giving tack and strength at room temperature. (Tg means glass transition temperature). The liability of TPs is high-temperature strength. Typically at temperatures exceeding 120° F., all strength is lost as the polymers adopt a parallel arrangement to force lines when stressed. Higher Mw polymers, in general, behave better at elevated temperatures, but usually require higher VOC solutions, and still the integrity at temperatures of approximately 140° F. or higher is suspect. VOC stands for volatile organic compound(s).

Water-based PSAs can be considered as nothing more than variants on the thermoplastic polymer theme. Again, low Tg, ultra-high Mw polymers are suspended in solution (water); film formation and chain entanglement then occur when the latex particles coalesce with drying.

The advantages of water-based PSAs are the abatement of air pollution (low VOC) and generally enhanced oxidation resistance of the final film. The liability of this chemistry is identical to its solvent-based counterpart;—high-temperature strength. To achieve better strength at high temperatures, higher Tg polymers are sometimes used and the trade-off is always tack;—the end-product does not efficiently grab contacting surfaces. Tack and high-temperature strength are the features which are diametrically opposed in TP chemistry.

Radiation-cured PSAs can be subdivided into electron beam (EB) films and ultraviolet curable (UV) films. The chemistry is similar in that uncured mixtures of unsaturated polymerizable compounds are irradiated in both instances, but EB films have dominated the past high-temperature market. Electron beam adhesives are usually formed by applying solutions (VOCs) of high Mw polymers with a small amount of double bonds to the substrate they will be used on, and then exposing the resultant film to a high-intensity electron gun. The electrons secondarily crosslink the already high Mw material giving a thermoset nature to the end-product. Final film Tg is not dramatically enhanced; Mw of the polymers approaches infinity, and therefore, the result is a film which has strength at elevated temperatures, up to 200° F., and tack at room temperature. EB films are satisfactory for some applications, but solutions must be used to apply the initially high MW prepolymers (e.g., detrimental VOC's), and the electron beam process is slow cumbersome, and costly. An EB gun costs approximately one million dollars.

UV cure is attractive, therefore, because it involves 100% convertible material with a simpler and more economical manufacturing process. Up to this point combinations of Mw oligomers have had to be used for application purposes; high Mw prepolymers are much higher in viscosity and, therefore, require a solvent. The problem in using low Mw oligomers is that it has been virtually impossible to generate high Mw end-products in the curing time frames usually encountered. The result is a lower overall Mw film which obtains its integrity via the incomplete polymerization of higher Tg starting materials. While this can give decent room temperature tack and cohesion, high-temperature strength is severely compromised. In the past UV-curable PSAs have had virtually no strength at 130° F.

Accordingly it is a primary object of the present invention to provide a new UV curable pressure sensitive adhesive composition, and method of using same.

Another object of the present invention is to provide a new UV curable pressure sensitive adhesive composition which exhibits good performance characteristics at temperatures in the range of approximately 130°–140° F. or higher.

Another object of the present invention is to provide a new UV curable pressure sensitive adhesive composition which exhibits excellent properties in terms of humidity resistance and high temperature performance.

Another object of the present invention is to provide a novel pressure sensitive adhesive composition which is environmentally friendly and economical to produce.

Other objects, features and advantages of the present invention will become apparent from the subsequent description and the appended claims.

SUMMARY OF THE INVENTION

While it is not fully or completely understood as to why the invention described herein produces such good results and highly desirable performance characteristics, it has been found that the UV curable pressure sensitive adhesive composition now to be described provides a highly advantageous new pressure sensitive adhesive.

Briefly stated, the invention concerns a new UV curable pressure sensitive adhesive composition, comprising in weight percent: (a) about 0.1% to about 15% photoinitiator agent, (b) about 10% to about 80% of a polyurethane resin with a pendent acrylate functionality and having a molecular weight within the range of about 500 to about 2,000,000, (c) about zero to about 70% of an acrylate monomer having a molecular weight within the range of about 50 to about 5,000, (d) about 0.1% to about 25% of an acrylated polybutadiene having a molecular weight within the range of about 500 to about 500,000, and (e) about zero to about 50% of a tackifier agent. The invention also involves a method of using the adhesive composition comprising the steps of: applying said adhesive composition to a substrate surface, subjecting said adhesive composition to ultraviolet radiation, positioning an object in contact with said adhesive composition to adhere said object in position on said substrate surface.

The acrylated polybutadiene, as shown in the later examples herein, is a material which is commercially available from Ricon Resins, Inc. of Grand Junction, Colo.

DESCRIPTION OF BEST MODE AND PREFERRED EMBODIMENTS

The photoinitiator agent used in the composition of the invention should preferably be of the free radical photoinitiator type. Typical photoinitiator agents that may be used are: diethoxyacetophenone, benzophenone, IRGACURE 651, or DAROCUR 1173. There are numerous other photoinitiator agents of a type similar to those just described, which can be used, and which will be apparent to those skilled in the art. Broadly stated the photoinitiator agent should be present within the composition within the broad range of about 0.1% to about 15% by weight of the composition, and preferably within the range of about 1/2% to about 10% by weight of the composition. Best results are obtained when the photoinitiator agent is present within the range of about 1% to about 6% by weight of the composition.

The polyurethane resin component of the composition should be a polyurethane resin which has a pendent acrylate functionality. It has been found that this polyurethane resin should have a molecular weight within the broad range of about 500 up to about 2,000,000, and preferably its molecular weight should be within the range of about 1,000 to about 500,000. Best results are obtained using a polyurethane resin having a molecular weight within the range of about 2,000 to about 30,000. The polyurethane resin should be present in the composition within the broad range of about 10% to about 80% by weight of the composition, and preferably within the range of about 20% to about 50% by weight. Best results are obtained when the polyurethane resin component is present within the range of about 20% to about 45% by weight of the composition. Suitable materials which can be used as this polyurethane resin are: Purelast 169V, Purelast 176A, Purelast 169, Purelast 166, and Purelast 165 [available from Polymer Systems Co. (Orlando, Fla.)], Ebecryl 230 (Radcure Co., Louisville, Ky.), Sartomer CN966, and Sartomer CN965 (Sartomer Co., Exton, Pa.).

The acrylate monomer for use in the composition is a monomer which inter reacts with the polyurethane resin. This acrylate monomer should have a molecular weight within the broad range of about 50 to about 5,000, and preferably its molecular weight is within the range of about 100 to about 2,000. Best results are obtained using an acrylate monomer having a molecular weight within the range of about 120 to about 500. The acrylate monomer may be present in the composition, broadly stated, within the range of about zero to about 70% by weight of the composition, and preferably it is present within the range of about 10% to about 55% by weight of the composition. However, in some instances the acrylate monomer may be present at a low level of only about 1% by weight. Best results are obtained when the acrylate monomer is present within the range of about 15% to about 50% by weight of the composition. Typical acrylate monomers which may be used in the composition are isobornyl acrylate (IBOA) monomer or the Sartomer acrylate monomer SR-339. The acrylate monomer can be described as being selected from at least one member of the group consisting of methacrylate monomer, an ethyl acrylate monomer, an isobornyl acrylate monomer, a cyclohexyl acrylate monomer, a butyl acrylate monomer, a propyl acrylate monomer, a pentyl acrylate monomer, a hexyl acrylate monomer, and a glycidyl acrylate monomer.

The acrylated polybutadiene component of the composition is also a very important constituent in properly preparing the pressure sensitive adhesive described herein. It has been discovered that the addition of a specified amount of this acrylated polybutadiene material (which should normally be obtained or prepared by a Ziegler Natta polymerization) enables the unique performance characteristics that are obtained with this invention in combination with the other important materials described. This polybutadiene material used in the composition should, broadly stated, have a molecular weight within the range of about 500 to about 500,000, and preferably within the range of about 1,000 to about 70,000. Best results are obtained when it has a molecular weight within the range of about 4,000 to about 6,000. This polybutadiene material as described herein should be present in the composition within the broad range of about 0.1% to about 25% by weight of the composition, and preferably within the range of about ½% to about 10% by weight. Best results are obtained when the acrylated polybutadiene material is present within the range of about 1% to about 5% of the composition. Maleic anhydride adducts of acrylated polybutadiene are also fully acceptable in this invention.

The tackifier agent used in the composition may suitably be any one of a number of different tackifiers such as rosins, rosins esters, tall oil rosins, pentaerythritol ester, and other commercially available aliphatic and aromatic tackifier materials. The tackifier agent, broadly stated, may be present in the composition within the range of zero to about 50% by weight of the composition, and preferably it is present within the range of about 0.1% to about 35% by weight of the composition. Best results are obtained when the tackifier agent is present within the range of about 5% to about 25% by weight of the composition.

Other optional additive materials may also be used in the composition of the invention, which optional materials may be present in relatively minor amounts that is, from about 0.05% to about 10% by weight of the composition. Such other optional materials that may be used in the composition are: pigments, rheology modifiers, flow aids, antioxidants, and/or bubble release agents.

DESCRIPTION OF THE DRAWING FIGURES

The drawing illustrations of FIGS. 1, 2 and 3 present in graphical representations the performance characteristics obtained with the adhesive compositions of this invention.

The FIG. 1 graph shows the markedly improved results obtained in terms of heat resistance using the UV curable pressure sensitive adhesive in accordance with Example 1. In FIG. 1 a prior art PSA adhesive composition is referred to as the PSA control. The adhesive composition in accordance with the Example 1 of this invention is designated ML-2525 1. FIG. 1 illustrates that the adhesive composition of the invention gave excellent resistance when tested for a time period of 15 hours continuously from 100° F. out to approximately 225° F.; whereas, the PSA control sample (the prior art PSA composition) markedly fell off in terms of heat resistance at approximately 125° F.–130° F. The test procedures for the FIG. 1 graph were carried out in overlapping shear mode, with a 1000 gram weight being attached to the shearing specimens, which were two tape-like substrates overlapped and adhered together with the PSA at an approximately one square inch overlap area. The adhesive was coated on the overlapping shear samples at a thickness of approximately 4 mils on all samples tested in FIG. 1.

The FIG. 2 graph illustrates the improved performance of the adhesive composition of the invention in terms of tack stability. In FIG. 2, the left hand side of the graph or chart is given in pounds per linear inch (PLI), versus time (n in weeks) on the lower coordinate. In the testing of FIG. 2 two tape-like substrates are adhered together using first a pressure sensitive adhesive composition of the prior art (PSA control), and the two substrates are pulled apart at a 180° pull angle, with the pull speed being approximately ½ inch per minute; and, the test is conducted at room temperature. The same procedure was used for testing the Example 1 composition of the invention, which is designated ML-25250 in FIG. 2.

In the graphical representation of FIG. 3, the marked improvement in humidity resistance characteristics for the composition of the invention is demonstrated. In FIG. 3 the test samples were again examined under lap shear mode, which indicates two tape-like substrates being adhered together with approximately a 1 square inch overlap at the lap shear area; and, a 1000 gram weight is hung off of the lower substrate until a failure occurs, that is until the two substrates separate through failure at the 1 square inch overlap area. The applied thickness of adhesive coating for both the prior art composition and the composition of the invention (Ex. 1) was approximately a 4 mil thickness.

For all of the tests conducted in FIG. 3 the humidity conditions throughout the test time frame were 100° F. and 100% relative humidity (non condensing) within the testing chamber.

In the FIG. 3 graphical representation, the improvement of the inventive composition is shown in terms of its markedly improved humidity resistance. In FIG. 3 the number of hours to failure is shown on the left hand side of the graph, and the test was terminated after 24 hours. As seen in the first test conducted on the left hand part of FIG. 3, indicated by columns 1A and columns 1B, the sample test in column 1A which utilized the Example 1 composition of this invention, performs satisfactorily throughout the entire 24 hour test period, at which time the test was terminated. Whereas the sample 1B material which was a prior art pressure sensitive adhesive control of the UV curable type, failed after approximately one hour of testing. This test as indicated by the columns 1A and 1B in FIG. 3, utilized a lap shear mode of testing wherein two approximately 1 inch wide tape substrates were coated at the overlap area (amounting to approximately 1 square inch of overlap surface) with an applied 4 mil thickness of the pertinent adhesive coating composition being applied. The tests in columns 1A and 1B were between two untreated polyester substrates.

In the test demonstrated by column 2A and column 2B in FIG. 3, the same type of test was conducted; however, the two substrates were an untreated polyester tape substrate applied to a stainless steel substrate with the same type of lap shear overlap mode being used, with a 1000 gram weight being hung from the adhered together substrates in order to conduct the test.

In the FIG. 3 test results shown by column 2A and column 2B it is seen again that the sample using the adhesive of Example 1 of this invention performs satisfactorily throughout the entire 24 hour test period, whereas the UV curable pressure sensitive adhesive control sample failed at approximately one hours time.

In the test conducted as shown by column 3A and column 3B in FIG. 3, the two substrates adhered together in the lap shear mode were a treated polyester substrate to a second treated polyester substrate, with an approximately 1 square inch overlap area being adhered together with approximately a 4 mil thick applied coating of the pertinent adhesive. As shown in column 3A the adhesive in accordance with Example 1 of the invention performs satisfactorily throughout the entire 24 hour test period, whereas the pressure sensitive adhesive control of the prior art failed after approximately one hours time.

In the last test conducted in FIG. 3, as shown by columns 4A and 4B the two substrates adhered together in the lap shear mode were a treated polyester substrate to a steel substrate, using an approximately 1 square inch adhesive overlap area, with a 1000 gram weight being hung from the lower substrate. Again the sample using the adhesive in accordance with Example 1 of the invention performed satisfactorily throughout the entire 24 hour test period, whereas the sample using the UV curable pressure sensitive adhesive composition of the prior art failed after approximately one hour's time.

In order to further illustrate the invention, the following examples are provided. It is to be understood, however, that the examples are included for illustrative purposes and are not intended to be limiting of the scope of the invention as set forth in the subjoined claims.

EXAMPLE 1

| | Parts by Weight | |
| --- | --- | --- |
| Purelast 169V | 29.60 | Urethane Resin |
| Purelast 176A | 3.52 | Urethane Resin |
| Ricacryl Lac (available from Ricon Resins, Inc. Grand Junction, Colo.) | 2.00 | acrylated polybutadiene |
| Sylvatac 25N | 4.23 | Tackifier |
| Norcote 02-065 | 1.15 | Flow Aid |

-continued

| Parts by Weight | | |
|---|---|---|
| IBOA Monomer (available from Radcure Co, Louisville, Ky.) | 28.11 | Acrylate Monomer (formula wgt. = 208) |
| SR-339 Monomer (available from Sartomer Co.) | 12.62 | Acrylate Monomer (formula wgt. = 192) |
| Foral-105 (Hercules, Inc., Wilmington, Del.) | 17.50 | Tackifier |
| DEAP (diethoxyacetophenone) | 0.36 | Initiator |
| Benzophenone (Upjohn Co.) | 1.08 | Initiator (M.W. = 182.21) |
| Irgacure 651 (Ciba-Geigy Corp.) | 1.62 | Initiator |
| Darocur 1173 (EM Industries, Inc. Hawthorne, N.Y.) | 0.91 | Initiator |

The Riacryl Lac™ material is commercially available from Ricon Resins, Inc.(Grand Junction, Colo.) and is known as an acrylated polybutadiene; and it has the following characteristics:

| Solvent | None |
|---|---|
| Nonvolatile Matter (w/w) | 98.0% |
| Microstructure | 25% ± 5% 1,2-vinyl |
| Molecular Weight | |
| $(M)_n$ | 5000 |
| $(M)_w$ | 21000 |
| Physical State | Viscous Liquid |
| Brookfield Viscosity (25° C.) | 9500 cP |
| Specific Gravity | 0.9 |
| Bulk Density | 7.6 lbs/gal |
| Flash Point (Tag Closed Cup) | N/A |
| Acid Number | 2.5 ppt KOH |
| Gardner Color | 9 Maximum |
| Inherent Viscosity (6 g real resin/100 ml toluene) | 0.133 typical –. |

| | Examples (In Parts By Weight) | | | | |
|---|---|---|---|---|---|
| Component | No. 2 | No. 3 | No. 4 | No. 5 | No. 6 |
| Purelast 169V | 35.90 | 40.90 | 16.01 | 26.90 | 26.90 |
| Purelast 176A | 5.52 | 7.52 | 7.52 | 3.52 | 3.52 |
| Ricacryl Lac | 2.14 | 2.00 | 2.00 | 2.00 | 2.00 |
| Sylvatac 25N | 4.23 | 4.23 | 4.23 | 4.23 | 4.23 |
| Norcote 02-065 | 1.15 | 1.15 | 1.15 | 1.15 | 1.15 |
| IBOA Monomer | 19.00 | 12.11 | 25.00 | 28.11 | 28.11 |
| SR-339 | 10.62 | 10.62 | 9.62 | 12.62 | 12.62 |
| Foral 105 | 17.50 | 17.50 | 30.50 | 17.50 | 17.50 |
| DEAP | 0.36 | 0.36 | 0.36 | 1.08 | 1.62 |
| Benzophenone | 1.08 | 1.08 | 1.08 | 0.36 | 0.36 |
| Irgacure 651 | 1.62 | 1.62 | 1.62 | 1.62 | 1.08 |
| Darocure 1173 | 0.91 | 0.91 | 0.91 | 0.91 | 0.91 |

| | Examples (In Parts By Weight) | | | | |
|---|---|---|---|---|---|
| Component | No. 7 | No. 8 | No. 9 | No. 10 | No. 11 |
| Purelast 169V | 26.90 | 26.90 | 26.90 | 26.90 | 26.90 |
| Purelast 176A | 8.52 | 8.52 | 10.52 | 3.52 | 3.52 |
| Ricacryl Lac | 2.00 | 2.00 | 2.00 | 2.00 | 2.00 |
| Sylvatac 25N | 10.23 | 10.23 | 12.43 | 4.23 | 4.23 |
| Norcote 02-065 | 1.15 | 1.15 | 1.15 | 1.15 | 1.15 |
| IBOA Monomer | 28.11 | 23.11 | 21.11 | 28.11 | 1.11 |
| SR-339 | 12.62 | 6.62 | 4.62 | 1.62 | 39.62 |
| Foral 105 | 6.50 | 17.50 | 17.50 | 28.50 | 17.50 |
| DEAP | 0.36 | 0.36 | 0.36 | 0.36 | 0.36 |
| Benzophenone | 1.08 | 1.08 | 1.08 | 1.08 | 1.08 |
| Irgacure 651 | 1.62 | 1.62 | 1.62 | 1.62 | 1.62 |
| Darocure 1173 | 0.91 | 0.91 | 0.91 | 0.91 | 0.91 |

| | Examples (In Parts By Weight) | | | | |
|---|---|---|---|---|---|
| Component | No. 12 | No. 13 | No. 14 | No. 15 | No. 16 |
| PURELAST 169V | 26.90 | 26.90 | 26.90 | 24.90 | 16.90 |
| PURELAST 176A | 3.52 | 3.52 | 3.52 | 3.52 | 8.52 |
| RICACRYL LAC | 6.00 | 2.00 | 2.00 | 4.00 | 6.00 |
| SYLVATAC 25N | 4.23 | 4.23 | 4.23 | 4.23 | 5.23 |
| NORCOTE 02-065 | 1.15 | 1.15 | 1.15 | 1.15 | 1.15 |
| IBOA Monomer | 24.11 | 28.11 | 28.11 | 28.11 | 28.11 |
| SR-339 | 12.62 | 12.62 | 12.62 | 10.62 | 10.62 |
| FORAL 105 | 17.50 | 17.50 | 17.50 | 17.50 | 17.50 |
| DEAP | 0.36 | 0.16 | 0.36 | 0.36 | 0.36 |
| Benzophenone | 1.08 | 1.28 | 1.78 | 1.78 | 1.78 |
| IRGACURE 651 | 1.62 | 1.62 | 1.62 | 1.62 | 1.62 |
| DAROCURE 1173 | 0.91 | 0.91 | 0.41 | 0.41 | 0.41 |

This invention allows efficient cross-linking of high Tg oligomers or polymers by coupling the polymerization mechanism to an extremely low Tg vinyl-terminated rubber. The rubber addition is unique and important because it crosslinks to the matrix simultaneously acting as a plasticizing resin and providing tack without sacrificing elevated temperature strength. Rubbers, in general, do not efficiently UV cure and act only as tackifiers/plasticizers in acrylate-based mixtures. The chosen rubber is a unique class of acrylated polybutadienes obtained from a Ziegler Natta polymerization. The pendant 1, 2-structure along the back bone is believed to polymerize into a growing free radical initiated moiety. All molecular weights referred to in this disclosure are number average molecular weights $(M)_n$.

While it will be apparent that the preferred embodiments of the invention disclosed are well calculated to fulfill the objects, benefits, and/or advantages of the invention, it will be appreciated that the invention is susceptible to modification, variation and change without departing from the proper scope or fair meaning of the subjoined claims.

What is claimed is:

1. A method comprising the steps of:
   applying a UV curable pressure sensitive adhesive composition, comprising in weight percent:
   (a) about 0.5% to about 10% photoinitiator agent,
   (b) about 20% to about 50% of a polyurethane resin with a pendent acrylate functionality, and having a molecular weight $(M_N)$ within the range of about 500 to about 2,000,000,
   (c) about 10% to about 55% of an acrylate monomer, having a molecular weight within the range of about 50 to about 5,000,
   (d) about ½% to about 10% of acrylated polybutadiene material having a molecular weight $(M_N)$ within the range of about 4000 to about 6000, and
   (e) about 0.1% to about 35% of a tackifier agent, to a substrate surface,
   subjecting said adhesive composition to ultraviolet radiation,
   positioning an object in contact with said adhesive composition to adhere said object in position on said substrate surface.

2. The method of claim 1 wherein,
   said polyurethane resin has a molecular weight $(M_N)$ within the range of about 1,000 to about 500,000,
   said acrylate monomer has a molecular weight within the range of about 100 to about 2,000.

3. The method of claim 2 wherein, (a) said photoinitiator agent is present from about 1.0% to about 6%, (b) said polyurethane resin is present from about 20% to about 45%, (c) said acrylate monomer is present from about 15% to about 50%, (d) said polybutadiene material is present from about 1% to about 5%, (e) said tackifier agent is present from about 5% to about 25%.

4. The method of claim 3 wherein, said polyurethane resin has a molecular weight ($M_N$) within the range of about 2,000 to about 30,000, said acrylate monomer has a molecular weight within the range of about 120 to about 500.

5. The method of claim 2 wherein, said photoinitiator agent is a free radical photoinitiator type, said acrylate monomer is selected from at least one member of the group consisting of a methacrylate monomer, an ethyl acrylate monomer, an isobornyl acrylate monomer, a cyclohexyl acrylate monomer, a butyl acrylate monomer, a propyl acrylate monomer, a pentyl acrylate monomer, a hexyl acrylate monomer, and a glycidyl acrylate monomer.

6. The method of claim 5 wherein, there is also included a minor amount of optional additive materials such as pigments, rheology modifiers, flow aids, antioxidants, or a bubble release agent.

7. The method of claim 5 wherein, there is also included a minor amount of optional additive materials such as pigments, rheology modifiers, flow aids, antioxidants, or a bubble release agent, and said tackifier agent is selected from at least one member of the group consisting of rosins, rosin esters, tall oil rosins, and pentaerythritol ester.

* * * * *